United States Patent Office 2,977,313
Patented Mar. 28, 1961

2,977,313

METHOD OF CLEANSING, STERILIZING, AND PREVENTING CORROSION IN BASE EXCHANGE AND CATION EXCHANGE SYSTEMS AND PRODUCTS USED THEREIN

Charles T. Roland, Bethel Borough, Pa., assignor, by mesne assignments, to Hagan Chemicals & Controls, Inc., a corporation of Pennsylvania No Drawing. Filed May 22, 1956, Ser. No. 586,350

10 Claims. (Cl. 252—99)

This invention relates to products which serve the three-fold function of simultaneously cleansing, sterilizing, and preventing corrosion in base exchange and cation exchange materials, processes, and equipment commonly used in domestic and commercial water softening operations and to methods for using these products.

The use of zeolite materials of the hydrated sodium-alumino silicate type to soften water by the cation exchange or, as it is more commonly denominated, the base exchange method, has been known and practiced for years. The zeolite may either be a naturally occurring mineral commonly known as greensand, or one which is synthesized by reacting sodium silicate and aluminum sulfate to produce a gel which is subsequently dried and further treated with caustic soda or other sodium-containing compounds to develop a high concentration of sodium cations. The term "zeolite' is used indiscriminately whether the material be naturally occurring or a synthetic product. However, both types are referred to as siliceous zeolites to distinguish them from other base exchange zeolites which are of more recent origin.

The function of the zeolite is well known. For example, in water softening it serves as an exchanger of cations, yielding its sodium ions in exchange for the calcium ions present in solution in the form of water soluble calcium salts. Most water supplies contain dissolved calcium bicarbonate, calcium sulfate, or other metal salts. When these waters are percolated through a bed of sodium ion treated zeolite, the effluent will contain sodium bicarbonate, sodium sulfate, and other sodium salts rather than the corresponding metal salt which was dissolved in the raw water. Removal of the calcium ion as well as other hardness producing ions such as the magnesium ion by this process of ion exchange yields a water commonly described as a "soft" water, which can be employed without the usual difficulties and inconveniences encountered when "hard" water containing dissolved hardness-producing salts is used. In many areas virtually all raw waters are so treated since the saving in soap and other detergent materials used for washing and cleansing processes more than equals the cost of treating the water.

In recent years other materials have been developed for use in cation exchange water softeners including a carbonaceous type of zeolite as well as various synthetic resins, particularly the phenol-formaldehyde and the sulfonated polystyrene types. One of the chief advantages of the synthetic resin type of cation exchange material over the inorganic sodium-alumino silicate type of material is its higher capacity and greater versatility. By capacity is meant the amount of cations per unit volume of zeolite. All zeolitic materials do not possess the same capacity. In fact the capacity of various synthetic siliceous zeolites will vary depending upon the particular composition which is used.

At this point a brief discussion of the regeneration of cation exchange materials is in order. Regeneration is the term used for the process of restoring the ability of the zeolite to exchange cations after it has been exhausted through use. The cation exchange materials are essentially insoluble in water so that there is but little dissolution or erosion of the material as water is passed through them. However, as the cation exchange process progresses, the reserve capacity of the material becomes less and less, finally the material completely loses its ability to exchange the sodium cation for the incoming calcium or other cation.

Obviously, the greater the amount of hard water which is passed through the cation exchange material and the greater the concentration of hardness-contributing cations in the water, the more rapidly the cation exchange process occurs. Ultimately the zeolite, be it the inorganic sodium-alumino silicate type or the synthetic organic resin type, becomes completely saturated with calcium, magnesium, iron, or other cations, having given up all of the sodium ion in the exchange process. When this point is reached, a regeneration or sodium cation replacement is necessary if the bed of solid cation exchange material is to serve any function other than that of a mere filtration bed.

Generally speaking, regardless of the type of cation exchange material employed in a water softener, the common material used for regeneration is sodium chloride. This material is widely available, it is inexpensive, and it is readily soluble in water to yield sodium ions. In certain water softening systems one finds a reservoir of concentrated sodium chloride brine which is available for regenerating the spent cation exchange material through appropriate connecting means which lead from the brine tank into the bed of zeolitic material. In other water softeners the sodium chloride is added in granular form through a suitable removable closure above the bed of zeolite. Water is added at the same point so that it percolates through the sodium chloride to achieve solution, and the brine filters slowly through the cation exchange material. In any event, the sodium cations of the salt solution are exchanged for the calcium and other cations which are present in the zeolite and the effluent solution, which then contains calcium and other metal chlorides rather than sodium chloride, is discharged to waste. Subsequent washing of the regenerated bed of cation exchange material with fresh water results in removing virtually all of the chlorides from the zeolitic bed so that the effluent will be essentially free from chlorides.

While I have described the normal functioning of zeolite water softeners and the practice of regeneration with sodium chloride solutions, there are certain difficulties which occur in zeolite water softening and which reduce the efficiency of the process.

These difficulties relate to the plugging of the interstices of the individual zeolite particles as well as the filter bed itself. Many natural waters contain undissolved suspended solids, either organic or inorganic in nature. Among the inorganic undissolved solids suspended in water are clay and silt particles as well as iron oxides or hydroxides commonly referred to as "rust." While the source of the clay and silt is the earth over or through which the raw water passes, the source of the rust may be iron originally dissolved in the raw water in a reduced state but subsequently oxidized and converted to the insoluble rust due to aeration or pumping of the raw water. The source of the rust may also be corrosion of the ferrous metal piping and equipment through which the water flows or corrosion of the metal contacted by the sodium chloride brine during the regeneration process.

Among the organic suspended solids in raw water are mold filaments, algae, clusters of micro organisms, and other cellular tissues orginating from living or dead plant and animal life of lower forms.

As previously described, the zeolite water softener acts as a filter bed. When water containing suspended solids is passed through the zeolite bed, some of the insoluble solids may be deposited or trapped on or within the bed or column of zeolite. Furthermore, some of the living organisms entrapped by the zeolite bed, finding conditions favorable, may reproduce and grow creating a slime or filamentous network within or on the zeolite bed.

Although the undissolved suspended solids, entrapped by the passage of raw water through the zeolite softener, generally do not impair the utility of the softened water they do decrease the efficiency of the process by plugging the interstices of the zeolite, with the result that free cat-ion exchange is physically blocked and the capacity of the zeolite is reduced proportionally.

Although certain operating parts of both the domestic and commercial zeolite water softening systems are fabricated from non-ferrous metals, most of the component parts of the system are made of steel or iron and are extremely sensitive to corrosion when contacted with brine solutions. Corrosion may occur in the concentrated brine make-up and storage tanks, on the piping and equipment in which the concentrated brine is diluted and transported, as well as in the zeolite softener itself. Corrosion is a serious problem not only because of the metal and equipment damage and loss but also because the rust particles are entrapped on or in the zeolite bed as previously described and thus impair the efficiency and lower the capacity. Where water hardness is high and consumption of water is on a relatively large scale, regeneration of the zeolite material is required at frequent intervals and the corrosion problem increases in direct proportion with the frequency of regeneration.

I have found that certain of the molecularly dehydrated polyphosphates when combined with other materials which will be fully described herein are extremely useful in combating the corrosive effect of the salt solutions which are present in the ordinary zeolite softening systems. The phosphates I use are broadly speaking the alkali-metal or ammonium salts of those polyphosphoric acid compounds having a molar ratio of alkali-metal (sodium, potassium, lithium, rubidium, and cesium) or ammonium radical ($NH_4$) to phosphorous pentoxide ($P_2O_5$) of from about 0.9:1 to about 2:1. The materials may be either glassy or crystalline in physical form, a preferred phosphate being the glassy commercial sodium salt having a molar ratio of $Na_2O:P_2O_5$ of about 1.1:1 which is slightly higher in sodium oxide content than the sodium metaphosphate ($NaPO_3$) which has a ratio of 1:1. A particularly useful phosphate is "Calgon" brand adjusted sodium hexametaphosphate specially processed for rapid solubility as covered by U.S. Patent 2,494,828. I may use any of the commonly available molecularly dehydrated phosphates such as the tetraphosphate ($Na_6P_4O_{13}$), the tripolyphosphate ($Na_5P_3O_{10}$), or the tetrapyrophosphate ($Na_4P_2O_7$) and intermediate compounds which have been assigned arbitrary formulae by various researchers in the art. The sodium salts are preferred in view of their availability and lower cost but it is understood of course, that the other alkali-metal and ammonium salts are effective and may be employed.

When zeolite water softeners are operated in the customary manner, sodium chloride, calcium chloride, and other metal chlorides are encountered during a regeneration cycle since the regenerating sodium chloride brine solution as it passes through the zeolite bed is transformed into a solution of chlorides of the hardness-forming metal cations. Obviously all of these chlorides are present at certain stages of regeneration. The phosphates perform the function of minimizing or preventing the corrosion of the various metals with which the normally corrosive chloride solutions come in contact. I have found that the phosphates which are effective in controlling corrosion in zeolite water softening operations also have another valuable property which renders them especially useful in the practice of my invention as they have the power of dispersing clays, silt, and many insoluble metal salts and oxides.

The dispersing properties of the phosphates which I employ are described in an article by Thomas H. Daugherty entitled "Sequestration, Dispersion, and Dilatancy—Lecture Demonstrations," published in the Journal of Chemical Education, volume 25, page 482, September 1948.

When my products are used in the treatment of zeolite water softeners, the silts, clays, metal oxides, and other metal salts which may be plugging or fouling the interstices of the zeolite particles or the bed are effectively dispersed into the aqueous medium during regeneration and then flushed to waste during the washing of the zeolite bed to remove residual chlorides.

The action of the phosphate in my process is not a softening of the water by sequestration, as outlined in Ralph E. Hall, U.S. Patent Re. 19,719. Actually, waters so treated can be quite corrosive to ferrous metals under certain conditions. Neither is it a prevention of the deposition of calcium carbonate by inhibition as outlined in several United States patents including the Fink and Richardson Patent No. 2,358,222. The action is akin to that described in Rice and Hatch Patent No. 2,337,856 relating to the general use of polyphosphates in controlling corrosion of natural water supplies under conditions of turbulence and flow such as in municipal waters. However, the amounts of phosphate employed by Rice and Hatch are insufficient under conditions prevailing in the operation of zeolite softening systems, to prevent corrosion by the various salt solutions. Furthermore, the versatility of my particular phosphate products in combination with other ingredients I use enable them to be used in an environment in which the phosphates of Rice and Hatch alone could not possibly operate as effective corrosion inhibitors.

To achieve the results which I have secured in reducing the corrosivity of the various salt solutions, I combine the molecularly dehydrated polyphosphates with one or more water-soluble compounds of calcium, zinc, strontium, cadmium, and barium, said elements being found in group II of the periodic system of classifying the elements. The most desirable compounds are the more common salts of calcium and zinc, such as the chlorides, sulfates, sulfites, phosphates, phosphites, nitrates, and nitrites. These are less costly and more readily obtainable.

Through the use of my process of treating cation exchange materials with the novel products I have formulated, I am able to prevent not only corrosion and plugging of the zeolite but also contamination and growth of micro-organisms, the latter being a serious problem in itself. It is quite well known that the cation exchange material actually filters micro-organisms from the water, and in some cases organisms such as "iron bacteria" have been known to thrive in the accumulation of rust and iron corrosion products in the zeolite bed. Furthermore, zeolite water softeners are susceptible to contamination with micro-organisms from human sources during the regeneration with salt. Generally speaking, most of the particular organisms encountered are not pathogenic but their build-up is undesirable in that a distinctly disagreeable taste and odor can be and often is imparted to the water which passes through the bed. Further, they often form a slime which may coat over the particles of zeolite and interfere with its normal operation, as previously described.

Manufacturers of zeolite softeners in recent years have recommended a disinfection of the cation exchange material to prevent contamination during regeneration and also to kill any micro-organisms which might be living in the zeolite bed. Such a procedure is a precautionary move against the possibility of pathogenic organisms being present. Disinfection with sodium hypochlorite, a commonly available and effective chlorine-containing material, at each regeneration, has been recommended in conjunction with the treatment of sodium-alumino silicate type of inorganic cation exchange material. However, neither sodium hypochlorite nor its homolog calcium hypochlorite are considered satisfactory for use with the newer resinous cation exchange materials such as the phenol-formaldehyde or sulfonated polystyrene resins. Published data shows that deterioration of the phenolic type of resins actually occurs when hypochlorite is used as the disinfecting agent.

Recent developments have tended toward the use of suitable sterilizing agents which can be universally applied to all types of cation exchange material. Considered as being one of the most effective and satisfactory sterilizing agents is chlorinated melamine which apparently has little or no deleterious effect upon the ion exchange material. A commercial chloromelamine made by Wallace & Tiernan Company, Inc., and sold as "Sterimine" is a white, free-flowing, dry compound containing approximately 50% of available chlorine. Although the chlorine in chloromelamine is relatively harmless to the resinous cation exchange materials as compared to that in hypochlorites such as sodium hypochlorite or calcium hypochlorite, it is quite effective against micro-organisms which are the chief problem. Comercial chloromelamine is soluble in water to the extent of about 300 p.p.m. of available chlorine, it is stable in storage, and apparently even at many times the usual disinfection dosage would have no deleterious effect upon human beings even were they to drink the direct effluent during the disinfection process. The preparation of chloromelamine is described in Muskat et al. Patent No. 2,184,883. Another chlorine compound which I have found to be particularly useful by virtue of its rapid solubility is dimethyldichlorohydantoin sold under the trade name "Halane" by Wyandotte Chemical Corporation. Another chlorine compound which is suitable is described in Schmelkes U.S. Patent 1,958,370 and defined therein as N-chloro derivatives of the oxidant in a redox system, and particularly N-N-di-chloro-azodicarbonamidine commonly referred to as azochloramid. In this connection, the disclosure in Halvorson U.S. Patent 2,263,948 is of interest. Other suitable chlorine compounds are trichlorocyanuric acid and its salts. Generally speaking, I may use any chlorine disinfecting compound in the broadest sense of the word, but I prefer the chlorinated melamines and dimethyldichlorohydantoin for reasons which have been set forth.

While I may combine the phosphates, metal salts, and chlorine-containing compounds in varying formulae to achieve successful results, the following range of ingredients is most admirably suited to the threefold problem which is encountered in practice:

| | Percent by weight |
|---|---|
| Phosphate | 70–85 |
| Soluble calcium, zinc, cadmium, strontium, or barium salt | 10–20 |
| "Sterimine" brand chloromelamine | 2–10 |

When using a calcium hypochlorite $Ca(OCl)_2 \cdot 4H_2O$ containing 70% available chlorine, the formula is varied thusly:

| | Percent by weight |
|---|---|
| Phosphate | 70–85 |
| Soluble calcium, zinc, cadmium, strontium, or barium salt | 18– 8 |
| $Ca(OCl)_2 \cdot 4H_2O$ | 10–15 |

In an alternative composition using calcium hypochlorite without added metal salt (since the calcium ion is supplied by the calcium hypochlorite), the following mixture is suitable.

| | Percent by weight |
|---|---|
| Phosphate | 75–90 |
| $Ca(OCl)_2 \cdot 4H_2O$ | 10–25 |

Preferred formulae incorporating "Calgon" brand glassy sodium phosphate (molar ratio of $Na_2O : P_2O_5$ of 1.1:1) which I have prepared are:

| | Percent by weight |
|---|---|
| Calgon | 70–85 |
| Calcium chloride | 10–20 |
| Sterimine | 2–10 | and a companion composition made with a calcium hypochlorite (Lo-Bax, manufactured by Mathieson Chemical Company and containing 50% available chlorine)

| | Percent by weight |
|---|---|
| Calgon | 75–90 |
| Lo-Bax | 10–25 |

Of course I may use a water-soluble salt of calcium, zinc, cadmium, strontium or barium even where I employ calcium hypochlorite as a sterilizing agent, viz:

| | Percent by weight |
|---|---|
| Calgon | 70–85 |
| Calcium chloride | 0–10 |
| $Ca(OCl)_2$ | 10–25 |

Where I use zinc sulfate as the water-soluble metal salt, the following formulation is effective:

| | Percent by weight |
|---|---|
| Calgon | 70–85 |
| $ZnSO_4$ | 0–10 |
| $Ca(OCl)_2$ | 10–25 |

An example of one of my most suitable mixtures is the following:

| | Percent by weight |
|---|---|
| "Calgon" brand adjusted sodium hexametaphosphate | 80 |
| Zinc sulfate | 15 |
| "Halane" brand dimethyldichlorohydantoin | 5 |

It will be recognized, of course, that the foregoing are presented only as specific examples of my preferred mixtures and that I may use two or more phosphates, two or more calcium, zinc, cadmium, strontium, or barium salts, and two or more sterilizing agents in my composition but for simplicity and ease of preparation, I generally employ a single phosphate, a single metal salt, and a single sterilizing agent.

This application is a continuation-in-part of my co-pending application, Serial No. 228,988, filed May 29, 1951, now abandoned.

Having thus described my invention, what I claim as new and desire to secure by Letters Patent is:

1. The method of cleaning, disinfecting, and preventing corrosion in a bed of cation exchange materials and water softening materials appurtenant thereto which comprises treating said materials with an aqueous solution of a mixture containing by weight from about 70 percent to about 85 percent of a molecularly dehydrated sodium phosphate having a molar ratio of $Na_2O:P_2O_5$ of from about 0.9:1 to about 2:1; from about 10 percent to about 20 percent of a water soluble salt of at least one metal selected from the group consisting of calcium, zinc, strontium, cadmium, and barium; and from about 2 percent to about 10 percent of a chlorinated melamine disinfecting agent.

2. The method of cleaning, disinfecting, and preventing corrosion in a bed of cation exchange materials and water softening materials appurtenant thereto which comprises treating said materials with an aqueous solution of a mixture containing by weight from about 70 percent to about 85 percent of a sodium phosphate glass; from about 18 percent to about 8 percent of a water soluble salt of at least one metal selected from the group consisting of calcium, strontium, zinc, cadmium, and barium; and from about 10 percent to about 15 percent of calcium hypochlorite.

3. The method of cleaning, disinfecting, and preventing corrosion in a bed of cation exchange materials and water softening materials appurtenant thereto which comprises treating said materials with an aqueous solution of a mixture containing by weight from about 70 percent to about 85 percent of a sodium phosphate glass having a molar ratio of $Na_2O:P_2O_5$ of about 1.1:1; from about 10 percent to about 25 percent of calcium chloride; and from about 3 percent to about 7 percent of a chlorinated melamine.

4. The method of cleaning, disinfecting, and preventing corrosion in a bed of cation exchange materials and water softening materials appurtenant thereto which comprises treating said materials with an aqueous solution of a mixture containing by weight from about 70 percent to about 85 percent of a sodium phosphate glass having a molar ratio of $Na_2O:P_2O_5$ of about 1.1:1; from about 10 percent to about 20 percent of zinc sulfate; and from about 2 percent to about 10 percent of a chlorinated melamine.

5. The method of cleaning, disinfecting, and preventing corrosion in a bed of cation exchange materials and water softening materials appurtenant thereto which comprises treating said materials with an aqueous solution of a mixture containing by weight from about 70 percent to about 85 percent of a sodium phosphate glass having a molar ratio of $Na_2O:P_2O_5$ of from about 0.9:1 to about 2:1; from about 10 percent to about 20 percent of zinc sulfate; and from about 2 percent to about 10 percent of dimethyldichlorohydantoin.

6. A cleansing, disinfecting, and corrosion preventing composition for use in treating cation exchange materials which consists essentially of the following ingredients:

(a) sodium phosphate glass having a molar ratio of $Na_2O:P_2O_5$ of about 1.1:1, from about 70 percent to about 85 percent by weight, (b) calcium chloride, from about 10 percent to about 20 percent by weight, (c) chlorinated melamine, from about 2 percent to about 10 percent by weight.

7. A cleansing, disinfecting, and corrosion preventing composition for use in treating cation exchange materials which consists essentially of the following ingredients:

(a) sodium phosphate glass having a molar ratio of $Na_2O:P_2O_5$ of about 1.1:1, from about 70 percent to about 85 percent by weight, (b) zinc sulfate, from about 10 percent to about 20 percent by weight, (c) chlorinated melamine, from about 2 percent to about 10 percent by weight.

8. A cleansing, disinfecting, and corrosion preventing composition for use in treating cation exchange materials which consists essentially of the following ingredients:

(a) sodium phosphate glass having a molar ratio of $Na_2O:P_2O_5$ of from about 0.9:1 to about 1.7:1, from about 70 percent to about 85 percent by weight, (b) zinc sulfate, from about 10 percent to about 20 percent by weight, (c) dimethyldichlorohydantoin, from about 2 percent to about 10 percent by weight.

9. A cleansing, disinfecting, and corrosion preventing composition for use in treating cation exchange materials which consists essentially of the following ingredients:

(a) sodium phosphate glass having a molar ratio of $Na_2O:P_2O_5$ of about 1.1:1, from about 70 percent to about 85 percent by weight, (b) zinc sulfate, from about 10 percent to about 20 percent by weight, (c) dimethyldichlorohydantoin, from about 2 percent to about 10 percent by weight.

10. A cleansing, disinfecting, and corrosion preventing composition for use in treating cation exchange materials which consists essentially of the following ingredients:

(a) sodium phosphate glass having a molar ratio of $Na_2O:P_2O_5$ of from about 0.9:1 to about 1.7:1, from about 70 percent to about 85 percent by weight.

(b) zinc sulfate, from about 10 percent to about 20 percent by weight, (c) disinfecting agent selected from the group consisting of chlorinated melamine, chloramine-T, chloramine-B, sodium hypochlorite, calcium hypochlorite, azochloramid, and dimethyldichlorohydantoin, from about 2 percent to about 10 percent by weight.

References Cited in the file of this patent

UNITED STATES PATENTS

| | | | |
|---|---|---|---|
| 1,892,548 | Feibelmann | | Dec. 27, 1932 |
| 1,894,207 | Taylor | | Jan. 10, 1933 |
| 1,989,380 | Romans | | Jan. 29, 1935 |
| 2,075,913 | Sanchez | | Apr. 6, 1937 |
| 2,155,045 | Griffith et al. | | Apr. 18, 1939 |
| 2,242,315 | Mac Mahon | | May 20, 1941 |
| 2,319,697 | Mac Mahon | | May 18, 1943 |
| 2,359,587 | Schwartz | | Oct. 3, 1944 |
| 2,430,233 | Magill | | Nov. 4, 1947 |
| 2,435,474 | Soule | | Feb. 3, 1948 |
| 2,446,869 | Cunningham | | Aug. 10, 1948 |
| 2,571,271 | Marks | | Oct. 16, 1951 |
| 2,578,270 | Strain | | Dec. 11, 1951 |
| 2,607,738 | Hardy | | Aug. 19, 1952 |
| 2,618,604 | Schaeffer | | Nov. 18, 1952 |
| 2,657,179 | Robinson | | Oct. 27, 1953 |
| 2,693,454 | Soule | | Nov. 2, 1954 |
| 2,756,214 | Albrecht | | July 24, 1956 |
| 2,795,556 | Quinn | | June 11, 1957 |